United States Patent [19]

Ogura et al.

[11] 4,129,373
[45] Dec. 12, 1978

[54] ELECTROPHOTOGRAPHIC APPARATUS

[75] Inventors: Yukio Ogura; Mitsuhisa Fukuda, both of Tokyo, Japan

[73] Assignee: Ricoh Company, Ltd., Tokyo, Japan

[21] Appl. No.: 831,624

[22] Filed: Sep. 8, 1977

[30] Foreign Application Priority Data

Sep. 9, 1976 [JP] Japan ............................ 51-120508[U]
Nov. 1, 1976 [JP] Japan ................................ 51-130544

[51] Int. Cl.² ..................... G03B 27/00; G03G 15/28; G03G 15/32
[52] U.S. Cl. ............................................ 355/1; 355/8; 355/11
[58] Field of Search ...................... 355/1, 8, 11, 47–52, 355/55–57, 60, 66

[56] References Cited

U.S. PATENT DOCUMENTS

| | | | |
|---|---|---|---|
| 2,791,949 | 5/1957 | Simmons et al. | 355/11 |
| 3,592,542 | 7/1971 | Käufer et al. | 355/50 |
| 3,687,545 | 8/1972 | Moorhusen | 355/8 X |
| 3,737,159 | 6/1973 | Washio et al. | 355/8 X |
| 3,977,777 | 8/1976 | Tanaka et al. | 355/8 X |
| 4,050,812 | 9/1977 | Koizumi et al. | 355/8 X |

FOREIGN PATENT DOCUMENTS 401442   2/1970   Australia ........................ 355/8

Primary Examiner—Donald A. Griffin
Attorney, Agent, or Firm—Frank J. Jordan

[57] ABSTRACT

A focussing optical fiber array is disposed between an original document carrier and a photosensitive member such as a photoconductive sheet to focus an image of a linear portion of an original document onto the sheet. A reflector means comprising a plurality of mirrors or prisms is provided between the optical fiber array and the sheet. The reflector means provides an inverted image by reflecting the image an odd number of times which is at least three times. The reflector means reflects the image onto the sheet parallel to the axis of the optical fiber array. A drive means produces relative scanning movement between the document carrier, optical fiber array and sheet.

9 Claims, 4 Drawing Figures

ELECTROPHOTOGRAPHIC APPARATUS

BACKGROUND OF THE INVENTION

The present invention relates to an electrophotographic apparatus such as an electrostatic copying machine comprising an improved optical imaging system which utilizes a focussing optical fiber array as a main converging element.

Focussing optical fiber arrays have been recently developed and offer a number of advantages when incorporated into electrophotographic apparatus such as electrostatic copying machines, facsimile devices and the like. Such optical fiber arrays provide and erect image with unity magnification.

However, due to the configuration of the scanning systems in such apparatus, it is sometimes desirable to provide an inverted, rather than an erect image. This is because it is advantageous to have the various elements of the scanning systems move in certain directions relative to each other.

One simple means of obtaining an inverted image is to reflect the image once by means of a plane mirror or triangular prism. However, image distortion occurs unless the image plane is substantially perpendicular to the object plane, and it is practically impossible to make the image and object planes parallel. Where an original document for electrophotographic reproduction is advantageously supported by a horizontal document carrier or platen, it is necessary to move a photosensitive element vertically for scanning. This creates a disadvantageous geometric arrangement of the optical system in the apparatus and leads to increased complexity, size and manufacturing cost. The use of a trapezoidal prism introduces astigmatism and degradation of the optical resolving power to an unacceptable extent.

SUMMARY OF THE INVENTION

The above described problems which have existed heretofore in the prior art are overcome in a novel manner in accordance with the present invention by providing reflecting means between the optical fiber array and the photosensitive member which reflect the image an odd number of times which is at least three times. This enables the image to be reflected from the reflecting means onto the photosensitive member substantially parallel to the optical fiber array, thereby enabling the image and object planes to be parallel and horizontal.

It is an object of the present invention to provide an electrophotographic apparatus such as an electrostatic copying machine comprising an improved optical system utilizing a focussing optical fiber array as the main converging element.

It is another object of the present invention to provide and electrophotographic apparatus comprising a focussing optical fiber array which provides an inverted image and parallel image and object planes.

It is another object of the present invention to provide an electrophotographic apparatus comprising a focussing optical fiber array which produces an inverted image free from astigmatic distortion.

It is another object of the present invention to provide a generally improved electrophotographic apparatus.

Other objects, together with the foregoing, are attained in the embodiments described in the following description and illustrated in the accompanying drawing.

DESCRIPTION OF THE PREFERRED EMBODIMENTS

While the electrophotographic apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
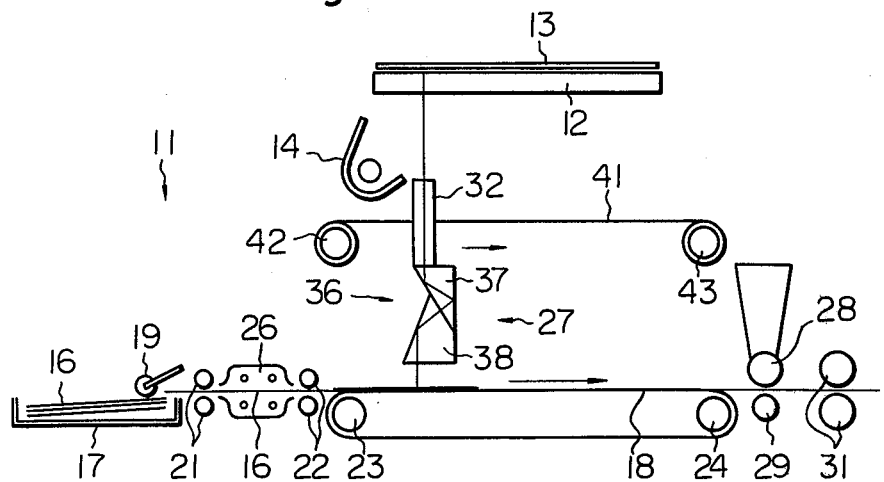
FIG. 1 is a schematic diagram of an electrostatic copying machine comprising an optical system embodying the present invention.
Figure 2:
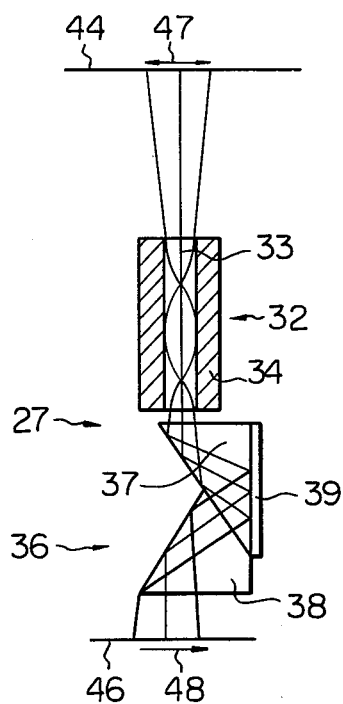
FIG. 2 is an enlarged view of the optical system.

Referring to FIGS. 1 and 2 of the drawing, an electrostatic copying machine embodying the present invention is generally designated by the reference numeral 11 and comprises an original document carrier or platen 12. An original document 13 for electrostatic reproduction is placed face down on the platen 12 and illuminated from below, through the platen 12, by a lamp 14.

A stack of copy sheets 16 is provided in a tray or cassette 17 and fed therefrom one at a time onto a conveyor belt 18 by means of feed rollers 19, 21 and 22. The conveyor belt 18 is disposed substantially parallel to the platen 12 directly therebelow, and is rotated clockwise at constant speed by means of rollers 23 and 24 around which the conveyor belt 18 is trained.

The copy sheets 16 are provided with a photoconductive coating and are maintained in the dark prior to use. A charging unit 26 disposed between the feed rollers 21 and 22 applies a uniform electrostatic charge to the copy sheets 16 as they pass therethrough.

The platen 12 is adapted to be especially advantageous for copying bulky documents such as books since it is maintained stationary. An optical system 27 of the present invention is provided between the platen 12 and conveyor belt 18 and focusses a light image of a linear portion (perpendicular to the plane of the drawing) onto the copy sheet 16 on the conveyor belt 18. The document 13 is scanned by moving the optical system 27 rightwardly at one-half the speed of the copy sheet 16 on the conveyor belt 18. This forms an electrostatic image of the document 13 on the copy sheet 16 through localized photoconduction. A feed roller 29 guides the exposed or imaged copy sheet 16 through a developing unit 28 which applies a dry or liquid toner substance to the copy sheet 16 to develop the electrostatic image into a toner image. Fixing rollers 31 thereafter fix the toner image to the copy sheet 16 by means of pressure, heat or a combination thereof to provide a permanent reproduction of the original document 13. The optical system 27 comprises an optical fiber array 32 which includes one or more parallel rows of optical fibers 33 embedded in a support block or substrate 34. Only one optical fiber 33 is visible in FIG. 2 since only one row is shown which extends perpendicular to the plane of the drawing. A curtain 41 trained around rollers 42 and 43 is formed with an opening for the array 32 and prevents any stray light from reaching the copy sheet 16 on the conveyor belt 18. The curtain 41 winds and unwinds from the rollers 42 and 43 in accordance with the movement of the array 32.

Disposed below the array 32 integrally therewith is a reflector means 36 comprising triangular prisms 37 and 38. The right lower corner of the prism 38 may be cut away as shown. The right surface of the prism 37 is made totally reflective by means of a reflective coating 39 of silver, aluminum or the like which may be advantageously formed by vacuum deposition.

The optical path of the optical system 27 is indicated by lines which are not designated by reference numerals for simplicity of illustration. In FIG. 2, an object plane 44 corresponds to the lower surface of the document 13 and an image plane 46 corresponds to the upper surface of the copy sheet 16 on the conveyor belt 18. Arrows 47 and 48 on the object and image planes 44 and 46 respectively indicate that an inverted image is formed on the image plane 46. The adjacent surfaces of the prisms 37 and 38 are preferably bonded together by optical cement.

The optical fibers 33 are formed in such a manner that the index of refraction thereof is maximum in the center and decreases parabolically in the radial direction. Rays of light propagate through the optical fibers 33 in a meandering or sinosoidal manner as indicated in FIG. 2.

After being converged by the optical fiber array 32, the image of the document 13 is reflected totally from the leftward diagonal surface of the prism 37 onto the reflective coating 39. The image is reflected totally a second time from the coating 39 through the prisms 37 and 38 onto the leftward diagonal surface of the prism 38. The image is totally reflected a third time from the leftward surface of the prism 38 through the prism 38 onto the copy sheet 16. Thus, it will be seen that the image is reflected an odd number of times, in this case three times, and is thereby inverted.

In addition, it will be seen that the image is reflected from the reflector means 36 onto the copy sheet 16 in coincidence with the optical axis of the optical fiber array 32. This enables the object and image planes 44 and 46 respectively to be parallel and horizontal so that the copy sheets 16 may be fed horizontally by the conveyor belt 18. Although not illustrated, the reflector means may be arranged so that the image is reflected therefrom onto the copy sheet 16 parallel to, but not coincident with, the optical axis of the array 32.

If desired, one or more of the surfaces of the prisms 37 and 38 may be coated with a material which functions as a color filter, or a separate color filter may be provided in the optical path of the optical system 27 although not illustrated.

Figure 3:
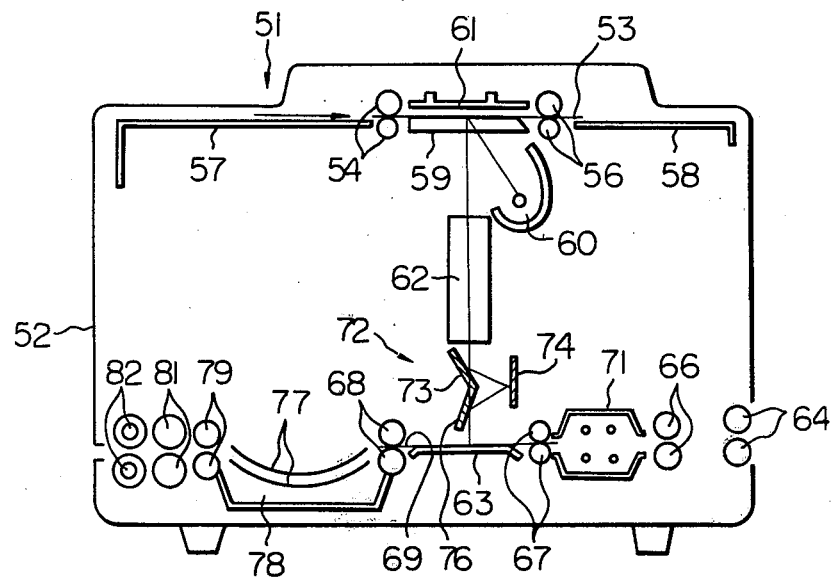
FIG. 3 is similar to FIG. 1 but shows a modified electrostatic copying machine and a second embodiment of an optical system according to the present invention.

FIG. 3 illustrates another electrostatic copying machine of the present invention which is generally designated as 51 and comprises a housing 52. An original document 53 is fed by feed rollers 54 and 56 from left to right over guides 57 and 58 onto a platen 59. A pressure plate 61 provided above the platen 59 maintains the document 53 flat. A lamp 60 illuminates the document 53 from below through the platen 59. This type of apparatus is advantageous where it is desired to make copies of a large number of original documents in sheet form, since they may be quickly fed through the copying machine 51.

A focussing optical fiber array 62 is disposed between the platen 59 and a guide 63. Feed rollers 64, 66, 67 and 68 feed a copy sheet 69 from right to left over the guide 63. A charging unit 71 provided between the feed rollers 66 and 67 applies a uniform electrostatic charge to the copy sheet 69 during passage therethrough.

A reflector means 72 which is equivalent to the reflector means 36 is provided between the array 62 and copy sheet 69 on the guide 63. The reflector means 72 comprises first, second and third plane mirrors 73, 74 and 76 respectively. The mirror 76 is disposed below the mirror 73 and the mirror 74 is disposed rightwardly of and facing the mirrors 73 and 76.

The image of the document 53 is reflected from the mirrors 73, 74 and 76 in sequence onto the copy sheet 69. As with the embodiment of FIGS. 1 and 2, the image is reflected from the third mirror 76 onto the copy sheet 69 in coincidence with the optical axis of the array 62. The image is reflected three times and thereby inverted.

It will be understood that in the copying machine 51 the array 62 is maintained stationary and the document 53 and copy sheet 69 are moved relative thereto at the same speed but in opposite directions for scanning.

From the feed rollers 68 the copy sheet 69 is guided by means of guides 77 through a developing tank 78 filled with liquid toner substance. From the developing tank 78, the copy sheet 69 is fed by feed rollers 79 to pressure rollers 81 which remove excess toner substance from the copy sheet 69 and fixing rollers 82 which fix the toner image to the copy sheet 69 through pressure, heat or a combination thereof. The finished copy is discharged from the left side of the copying machine 51.

Figure 4:
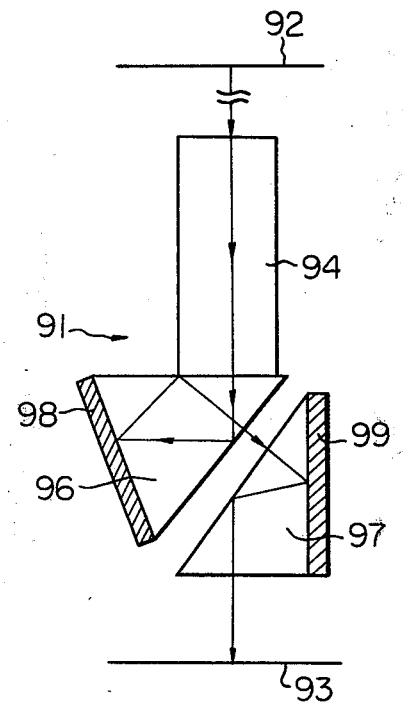
FIG. 4 is an enlarged view of a third embodiment of an optical system according to the present invention which may be incorporated into the copying mchines of both FIGS. 1 and 3.

FIG. 4 shows another optical system 91 which can be used in both of the copying machines 11 and 51, which reflects the image five times rather than three times. The optical system 91 is symbolically illustrated as being disposed between an object plane 92 and an image plane 93.

The optical system 91 comprises a focussing optical fiber array 94 of the same type described hereinabove and first and second triangular prisms 96 and 97. The left diagonal surface of the prism 96 and the right vertical surface of the prism 97 are provided with reflective coatings 98 and 99 respectively. The upper horizontal surface of the prism 96 is preferably adhered to the lower end of the array 94 by means of optical adhesive.

The image is converged by the array 94 and passes through the prism 96 to the right diagonal surface thereof. The image is reflected totally a first time from the right diagonal surface of the prism 96 to the reflective coating 98 formed on the left diagonal surface of the prism 96. From the coating 98 the image is reflected totally a second time to the upper horizontal surface of the prism 96. From the upper surface of the prism 96 the image is reflected totally a third time through the prisms 96 and 97 onto the right vertical surface of the prism 97 which is provided with the reflective coating 99. From the coating 99 the image is reflected totally a fourth time onto the left diagonal surface of the prism 97, from which the image is reflected totally a fifth time through the prism 97 onto the image plane 93. As with the previous embodiments, the image is reflected onto the image plane 93 in coincidence with the axis of the optical fiber array 94.

In summary, it will be seen that the present invention provides an advantageous means of forming an inverted image from a focussing optical fiber array in coincidence with or parallel to the axis of the array. This is accomplished without the astigmatic distortion caused by the trapezoidal prisms. Various modifications will become possible for those skilled in the art after receiving the teachings of the present disclosure without departing from the scope thereof. For example, the present invention may be applied to an electrostatic copying machine in which the photosensitive member is in the form of a drum or belt utilized as a transfer medium. The present invention may also be applied to a facsimile system or the like in which the photosensitive member is in the form of an electronic photosensor means.

What is claimed is:

1. An electrophotographic apparatus comprising, in combination:

a document carrier for supporting an original document;

a photosensitive member;

a stationary focussing optical fiber array for focussing a light image of a linear portion of the original document onto the photosensitive member;

drive means for producing relative scanning movement between the document carrier, optical array and photosensitive member in such a manner that the document carrier and the photosensitive member are moved relative to the optical fiber array; and reflector means comprising two triangular prisms disposed between the optical fiber array and the photosensitive member for reflecting the light image an odd number of times which is at least three times, the reflector means reflecting the light image onto the photosensitive member substantially parallel to the optical axis of the optical fiber array.

2. An apparatus as in claim 1, further comprising a reflective coating formed on a reflecting surface of one of the triangular prisms.

3. An apparatus as in claim 1, in which the reflector means reflects the light image onto the photosensitive member in substantial coincidence with the optical axis of the optical fiber array.

4. An apparatus as in claim 1, further comprising a curtain for preventing any stray light from reaching the photosensitive member.

5. An electrophotographic apparatus comprising, in combination:

a stationary document carrier for supporting an original document;

a photosensitive member;

a focussing optical fiber array for focussing a light image of a linear portion of the original document onto the photosensitive member;

drive means for producing relative scanning movement between the document carrier, optical fiber array and photosensitive member in such a manner that the optical fiber array and the photosensitive member are moved relative to the document carrier; and reflector means comprising two triangular prisms disposed between the optical fiber array and the photosensitive member for reflecting the light image an odd number of times which is at least three times, the reflector means reflecting the light image onto the photosensitive member substantially parallel to the optical axis of the optical fiber array.

6. An apparatus as in claim 5, in which the drive means moves the photosensitive member at twice the speed as the optical fiber array.

7. An apparatus as in claim 5, further comprising a reflective coating formed on a reflecting surface of one of the triangular prisms.

8. An apparatus as in claim 5, in which the reflector means reflects the light image onto the photosensitive member in substantial coincidence with the optical axis of the optical fiber array.

9. An apparatus as in claim 5, further comprising a curtain for preventing any stray light from reaching the photosensitive member.

* * * * *